United States Patent
Kishimoto et al.

(10) Patent No.: US 9,926,613 B2
(45) Date of Patent: Mar. 27, 2018

(54) METHOD OF PRODUCING SUGAR SOLUTION

(71) Applicant: Toray Industries, Inc., Tokyo (JP)

(72) Inventors: Junpei Kishimoto, Kamakura (JP); Hiroyuki Kurihara, Kamakura (JP); Atsushi Minamino, Kamakura (JP); Katsushige Yamada, Kamakura (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/395,231

(22) PCT Filed: Apr. 25, 2013

(86) PCT No.: PCT/JP2013/062195
§ 371 (c)(1),
(2) Date: Oct. 17, 2014

(87) PCT Pub. No.: WO2013/161935
PCT Pub. Date: Oct. 31, 2013

(65) Prior Publication Data
US 2015/0083118 A1  Mar. 26, 2015

(30) Foreign Application Priority Data

Apr. 26, 2012 (JP) .................................. 2012-100944

(51) Int. Cl.
| | | |
|---|---|---|
| C13K 1/00 | (2006.01) | |
| C13K 13/00 | (2006.01) | |
| B01D 61/02 | (2006.01) | |
| C13K 1/02 | (2006.01) | |

(52) U.S. Cl.
CPC .............. *C13K 1/00* (2013.01); *B01D 61/022* (2013.01); *B01D 61/027* (2013.01); *C13K 1/02* (2013.01); *C13K 13/002* (2013.01); *B01D 61/025* (2013.01)

(58) Field of Classification Search
CPC ...................................................... C13K 1/00
See application file for complete search history.

(56) References Cited

U.S. PATENT DOCUMENTS

| | | | |
|---|---|---|---|
| 8,252,350 B1 * | 8/2012 | Cadwalader .............. | C12F 3/10 426/11 |
| 2004/0006222 A1 | 1/2004 | Paananen et al. | |
| 2005/0056600 A1 * | 3/2005 | Ranney ................ | B01D 61/022 210/806 |
| 2005/0069997 A1 * | 3/2005 | Adkesson et al. ............ | 435/158 |
| 2010/0125135 A1 * | 5/2010 | Harmer .................... | C08H 6/00 536/123.1 |
| 2011/0237778 A1 * | 9/2011 | Reaney et al. ................. | 530/370 |
| 2011/0250637 A1 * | 10/2011 | Kurihara .............. | B01D 61/022 435/41 |
| 2012/0253082 A1 * | 10/2012 | Morita .................... | C07C 29/76 568/869 |
| 2013/0079509 A1 * | 3/2013 | Mattila ................ | B01D 61/027 536/127 |

FOREIGN PATENT DOCUMENTS

| | | |
|---|---|---|
| CN | 101787398 | 7/2010 |
| EP | 1 354 068 | 10/2003 |
| EP | 1 366 198 | 12/2003 |
| WO | 02/053781 | 7/2002 |
| WO | 02/053783 | 7/2002 |
| WO | 2009/110374 A1 | 9/2009 |
| WO | 2010/067785 A1 | 6/2010 |
| WO | WO 2010/067785 * | 6/2010 |
| WO | 2011/111451 A1 | 9/2011 |
| WO | 2011/154604 | 12/2011 |
| WO | 2012/133477 A1 | 10/2012 |

OTHER PUBLICATIONS

Table of Dielectric Constants of Pure Liquids U.S. Department of Commerce—Bureau of Standards Circular 514, pp. 1-54 Arthur A. Maryott and Edgar R. Smith Aug. 10, 1951.*
Supplementary European Search Report dated Dec. 4, 2015 of corresponding European Application No. 13780943.0.
First Office Action dated Oct. 8, 2015, of corresponding Chinese Application No. 201380021703.6 along with an English translation.

* cited by examiner

Primary Examiner — Douglas B Call
(74) Attorney, Agent, or Firm — DLA Piper LLP (US)

(57) ABSTRACT

A method of producing a sugar liquid includes filtering a sugar liquid through a nanofiltration membrane and collecting a sugar liquid from the feed side, wherein a sugar liquid containing an organic liquid compound having a relative dielectric constant of not less than 17 at 25° C. is filtered through the nanofiltration membrane.

4 Claims, No Drawings

METHOD OF PRODUCING SUGAR SOLUTION

TECHNICAL FIELD

This disclosure relates to a method of producing a sugar liquid, comprising a step of filtration through a nanofiltration membrane.

BACKGROUND

The process of fermentation production of a chemical product using a sugar as a raw material is utilized for production of various industrial materials. Examples of sugars that can be industrially used as fermentation feedstocks at present include those derived from edible materials such as sugar cane, starch and sugar beet. However, there is a concern of future shortage of edible materials due to an increase in the world population, which may lead to a rise in the prices. Thus, a process of efficiently producing a sugar liquid from a renewable nonfood resource, that is, cellulose-containing biomass, needs to be constructed.

Cellulose-containing biomass mainly contains lignin, which is an aromatic polymer, and cellulose and hemicellulose, which are polymers of monosaccharides. Examples of methods of producing a sugar liquid using a cellulose-containing biomass as a material include a method in which concentrated sulfuric acid or the like is used for direct hydrolysis of a material cellulose biomass, and a pretreatment-enzymatic saccharification method in which a cellulose-containing biomass is preliminarily subjected to pretreatment such as steaming, pulverization or dilutesulfuric-acid treatment to separate cellulose and hemicellulose from lignin, and hydrolysis is then carried out using a saccharifying enzyme such as cellulase.

In methods of producing a sugar liquid using a cellulose-containing biomass as a material, fermentation inhibitors such as hydroxymethylfurfural (HMF), furfural and vanillin are produced in the process of pretreatment, and these inhibit fermentation of the obtained sugar liquid during production of alcohol or the like by fermentation of the sugar liquid, which has been problematic. Moreover, depending on treatment conditions in the production of a sugar liquid, the sugar concentration in the sugar liquid may be low, and it is therefore necessary to increase several to about 10-fold the sugar concentration before subjecting the sugar liquid to the fermentation step. As a method by which fermentation inhibitors contained in the sugar liquid can be removed and, at the same time, the sugar concentration can be increased, a method comprising filtering a sugar liquid through a nanofiltration membrane and collecting a sugar liquid from the feed side is known (see WO 2009/110374 and WO 2010/067785).

We discovered a problem that, when a sugar liquid is filtered through a nanofiltration membrane, sugar is blocked in the feed side of the nanofiltration membrane, but loss of sugar into the permeate side of the nanofiltration membrane inevitably occurs, resulting in a low yield of the sugar liquid collected from the feed side. In view of this, it could be helpful to provide a method that can reduce, during filtration of a sugar liquid through a nanofiltration membrane, loss of sugar into the permeate side of the nanofiltration membrane.

SUMMARY

We discovered that the permeation rate of sugar through a nanofiltration membrane can be remarkably decreased by filtering a sugar liquid containing an organic liquid compound having a relative dielectric constant of not less than 17 at 25° C. through a nanofiltration membrane, as compared to when a sugar liquid which does not contain the organic liquid compound is filtered through a nanofiltration membrane.

We thus provide:

(1) A method of producing a sugar liquid, the method comprising the step of filtering a sugar liquid through a nanofiltration membrane and collecting a sugar liquid from the feed side, characterized in that a sugar liquid containing an organic liquid compound having a relative dielectric constant of not less than 17 at 25° C. is filtered through the nanofiltration membrane.

(2) The method of producing a sugar liquid according to (1), wherein the organic liquid compound is at least one selected from the group consisting of ethanol, methanol, 1-propanol, 2-propanol, 1,2-propanediol, 1,3-propanediol, glycerin, 1-butanol, 2-butanol, isobutanol, 1,2-butanediol, 1,3-butanediol, 1,4-butanediol, 2,3-butanediol, ethylene glycol, acetone, acetonitrile, acrylonitrile, dimethylsulfoxide and dimethylformamide.

(3) The method of producing a sugar liquid according to (1) or (2), wherein the total concentration of the organic liquid compound having a relative dielectric constant of not less than 17 at 25° C. in the sugar liquid to be subjected to nanofiltration membrane treatment is not less than 50 ppm.

(4) The method of producing a sugar liquid according to any one of (1) to (3), wherein the sugar liquid to be subjected to nanofiltration membrane treatment is derived from a cellulose-containing biomass.

(5) The method of producing a sugar liquid according to any one of (1) to (4), wherein the permeate through the nanofiltration membrane is filtered through a reverse osmosis membrane to collect an organic liquid compound.

In a method of producing a sugar liquid comprising filtering through a nanofiltration membrane, loss of sugar into the permeate side of the nanofiltration membrane can be reduced. Therefore, the yield of the sugar liquid can be increased.

DETAILED DESCRIPTION

Modes of carrying out our methods are described below in detail. This disclosure is not limited by the examples of carrying out the methods described below. The constituents also include constituents which can be easily envisaged by those skilled in the art, and constituents that are substantially identical, that is, the so-called "scope of equivalents." The constituents may be arbitrarily combined, or may be arbitrarily selected and used.

The sugar liquid means an aqueous solution in which sugar is dissolved. Examples of the sugar include monosaccharides such as glucose, xylose, galactose, fructose, mannose and arabinose; disaccharides such as maltose, cellobiose, sophorose, xylobiose, lactose and sucrose; water-soluble polysaccharides such as cello-oligosaccharide and xylo-oligosaccharide; deoxy sugars such as fucose and rhamnose; and sugar alcohols such as xylitol and sorbitol. The sugar liquid may contain an impurity other than sugar, and the impurity component is not limited. The material for the sugar liquid is not limited, and an edible carbohydrate or starch may be used as the material, or a nonfood polysaccharide such as cellulose may be used as the material. A cellulose-containing biomass is preferably used as the material since the step of filtering a sugar liquid through a nanofiltration membrane (nanofiltration membrane treatment step) is a step preferably employed in a method of producing a sugar liquid using a cellulose-containing biomass as a material (see WO 2010/067785).

Examples of the cellulose-containing biomass include herbaceous biomasses such as bagasse, switchgrass, napier grass, *Erianthus*, corn stover (stems and leaves of maize), corncob (core of maize), rice straw and wheat straw; and woody biomasses such as trees and waste building materials. Such cellulose-containing biomasses contain polysaccharides including cellulose and hemicellulose, and a sugar liquid can be produced by hydrolysis of such polysaccharides.

In general, hydrolysis of a cellulose-containing biomass is called saccharification. A sugar liquid obtained by saccharification of a cellulose-containing biomass is referred to as a cellulose-derived sugar liquid. A cellulose-derived sugar liquid contains monosaccharides such as glucose, xylose, mannose and arabinose; disaccharides such as cellobiose and xylobiose; and water-soluble polysaccharides such as cello-oligosaccharide and xylo-oligosaccharide. These sugars can be used as fermentation feedstocks (carbon sources), and can be converted by microorganisms into various chemical products such as ethanol, lactic acid and amino acid. The method of producing a cellulose-derived sugar liquid is not limited and, for example, it may be produced by the method described in WO 2010/067785.

The method of producing a sugar liquid comprises the step of filtering the abovementioned sugar liquid through a nanofiltration membrane and collecting a sugar liquid from the feed side. A nanofiltration membrane is a separation membrane generally defined as a "membrane that allows permeation of monovalent ions but blocks divalent ions," and also called a nanofilter or NF membrane. A nanofiltration membrane has voids of as small as several nanometers, and is mainly used to block microparticles, molecules, ions, salts and/or the like in water. As described in WO 2010/0677785, a nanofiltration membrane is also used in the step of concentration/purification of a sugar liquid since the membrane can remove fermentation inhibitors contained in a cellulose-material-derived sugar liquid into the permeate side, while blocking sugars in the feed side. The nanofiltration membrane treatment step may also be carried out according to the method described in WO 2010/067785.

When a sugar liquid is filtered through a nanofiltration membrane, most sugar is blocked in the feed side by the nanofiltration membrane. However, as describe in the later Examples, a problem that part of sugar permeates into the filtrate side, resulting in a low sugar yield has been found. In view of this, the permeation rate of sugar through a nanofiltration membrane is reduced by filtering a sugar liquid containing an organic liquid compound having a relative dielectric constant of not less than 17 at 25° C. through the nanofiltration membrane.

The organic liquid compound means an organic compound having a melting point of less than 30° C. at normal pressure (0.1 MPa).

The relative dielectric constant means the ratio between the dielectric constant of vacuum and the dielectric constant of a dielectric substance. The dielectric constant indicates how easily polarization occurs in a dielectric substance (insulator). In a condenser, application of a predetermined voltage between plates under conditions where nothing exists between the plates, that is, in vacuum, causes accumulation of electric charge on the plates until the same voltage as the applied voltage is produced. However, when the space between the plates of a condenser is filled with a dielectric substance, polarization of the dielectric substance weakens the electric field, causing accumulation of more electric charge in the condenser. That is, the capacitance of the condenser increases. Thus, the more easily the dielectric substance lying between the plates causes polarization, the more the capacitance increases. Accordingly, the dielectric constant $\in$ (F/m) is defined as the amount that satisfies $C=\in S/d$, wherein C represents the capacitance (F); d represents the distance between the plates (m); and S represents the area of the plate (m$^2$). The relative dielectric constant can be determined by measuring the capacitance of a condenser in which a vacuum is maintained between plates and the capacitance of a condenser filled with a dielectric substance between plates, and then calculating the ratio between these. The thus determined relative dielectric constant of an organic liquid compound is known to have a value unique to the substance. It is known that the dielectric constant is also influenced by the temperature of the dielectric substance, and that the dielectric constant of a liquid generally decreases as the temperature increases. It is also known that the difference in the dielectric constant of a liquid due to difference in the temperature tends to be large when the dielectric constant is high, while it tends to be small when the dielectric constant is low. In pure water, which has a high dielectric constant, the relative dielectric constant at 20° C. is 80.4, and the relative dielectric constant at 25° C. is 78.5. On the other hand, in cases of 1,2-dichloroethane, which has a relatively low dielectric constant, the relative dielectric constant at 20° C. is 10.65, and the relative dielectric constant at 25° C. is 10.36. The relative dielectric constant at 25° C. was used as the standard. Examples of apparatus that measure the dielectric constant of organic liquid compounds include a dielectric constant meter for liquids, "Model 871" (manufactured by RUFUTO).

We discovered that the permeation rate of sugar through a nanofiltration membrane decreases when a sugar liquid containing an organic liquid compound having a relative dielectric constant of not less than 17 at 25° C. is filtered through a nanofiltration membrane. This is assumed to be due to the fact that, when an organic liquid compound has a relative dielectric constant of not less than 17, the organic liquid compound has affinity to sugar molecules, resulting in high apparent molecular weights of the sugar molecules. However, the cause is unclear. In a cellulose-derived sugar liquid containing an organic liquid compound having a relative dielectric constant of not less than 17 at 25° C., the permeation rates of sugars decrease, but the permeation rates of the fermentation inhibitors described above do not change at all. Therefore, by filtering a sugar liquid derived from a cellulose-containing biomass through a nanofiltration membrane under conditions where the sugar liquid derived from a cellulose-containing biomass contains an organic liquid compound having a relative dielectric constant of not less than 17 at 25° C., only the yield of sugar can be increased without influencing properties to remove fermentation inhibitors.

At least one type of organic liquid compound having a relative dielectric constant of not less than 17 at 25° C. is contained in a sugar liquid. Accordingly, our methods also includes cases when an organic liquid compound having a relative dielectric constant of not less than 17 and an organic liquid compound having a relative dielectric constant of less than 17 coexist in a sugar liquid.

The organic liquid compound in the sugar liquid to be subjected to filtration through a nanofiltration membrane has a relative dielectric constant at 25° C. of not less than 17, preferably not less than 20, more preferably not less than 25. This is because the effect to decrease the permeation rate of sugar through a nanofiltration membrane can be seen when the relative dielectric constant at 25° C. of the organic liquid compound is not less than 17; the effect is remarkable when constant is not less than 20; and the effect is more remarkable when the constant is not less than 25. Although there is no upper limit of the relative dielectric constant at 25° C., the upper limit is preferably 120. The permeation rate of each compound through a nanofiltration membrane means the value determined by filtering a liquid containing the compound dissolved therein (raw liquid) through a nanofiltration membrane and dividing the concentration of the compound contained in the filtrate by the concentration of the compound contained in the raw liquid. The permeation rate of each compound is influenced by the concentration of the compound, type of the separation membrane, permeation flux, temperature and pH. In view of this, comparison of the effect to reduce the permeation rate of each compound (glucose or xylose) by an organic liquid compound in the sugar liquid is carried out under conditions where the concentration of each compound, type of the separation membrane, permeation flux, temperature and pH are constant.

Examples of the organic liquid compound having a relative dielectric constant of not less than 17 (each value in the parentheses represents the relative dielectric constant at 25° C.) include ethanol (24.8), methanol (32.6), 1-propanol (20.3), 2-propanol (19.8), 1,2-propanediol (30.2), 1,3-propanediol (34.2), glycerin (45.0), 1-butanol (17.4), 2-butanol (17.2), isobutanol (17.5), 1,2-butanediol (29.5), 1,3-butanediol (30.0), 1,4-butanediol (31.9), 2,3-butanediol (28.5), ethylene glycol (40.1), acetone (20.6), acetonitrile (35.6), acrylonitrile (32.7), dimethylsulfoxide (46.0) and dimethylformamide (36.9).

The concentration range of the organic liquid compound having a relative dielectric constant of not less than 17 at 25° C. in the sugar liquid to be subjected to filtration through a nanofiltration membrane is preferably 50 ppm to 10,000 ppm, more preferably 500 ppm to 10,000 ppm, still more preferably 5000 ppm to 10,000 ppm. This is because the effect to decrease the permeation rate of sugar through a nanofiltration membrane can be seen when the concentration is not less than 50 ppm; the effect is remarkable when the concentration is 500 ppm; and the effect to decrease the permeation rate of sugar through a nanofiltration membrane almost reaches the upper limit when the concentration is 5000 ppm. On the other hand, when the concentration is more than 10,000 ppm, the effect to decrease the permeation rate of sugar through a nanofiltration membrane cannot be further increased while the cost of adding the organic liquid compound increases.

In filtration of a sugar liquid containing an organic liquid compound through a nanofiltration membrane, most of the organic liquid compound permeates into the filtrate side. Since, by further filtering the filtrate through a reverse osmosis membrane, the organic liquid compound can be concentrated in the feed side, the organic liquid compound can be recovered and reused in the method of producing a sugar liquid. Since the filtrate in the permeate side after filtration of a sugar liquid through a nanofiltration membrane is usually discarded as a waste liquid, it is economically advantageous if the filtrate is concentrated with a reverse osmosis membrane and reused as the organic liquid compound.

EXAMPLES

Examples are described below, but this disclosure is not limited to these.

Reference Example 1

Calculation of Permeation Rate

The permeation rate of each compound through a nanofiltration membrane means the value determined by filtering a liquid containing the compound dissolved therein (raw liquid) through a separation membrane and dividing the concentration of the compound contained in the filtrate by the concentration of the compound contained in the raw liquid. Since the permeation rate of each compound through a nanofiltration membrane is influenced by the permeation flux, liquid temperature, pH and the like, measurement of the permeation rate through a nanofiltration membrane in the Examples was carried out at a permeation flux of 0.5 m/day, temperature of 25° C. and pH of 5. The permeation flux (m/day) is the value determined by dividing the permeation flux ($m^3$/day) by the effective area of the separation membrane ($m^2$). The pH of the solution was adjusted using sulfuric acid or sodium hydroxide before the filtration through a nanofiltration membrane.

Reference Example 2

Process of Preparing Sugar Liquid Derived from Cellulose-Containing Biomass

As the cellulose-containing biomass, rice straw was used. The rice straw was pulverized using a cutter mill while the particle size was controlled with a screen having an aperture of 4 mm. The pulverized rice straw was immersed in water, and subjected to treatment with an autoclave (manufactured by Nitto Koatsu Co., Ltd.) at 180° C. for 5 minutes with stirring. The pressure during the autoclaving was 10 MPa. To the obtained slurry, a preparation of cellulase derived from *Trichoderma reesei* (Accellerase DUET, manufactured by Genencor) was added such that the dry weight of the enzyme protein corresponded to $1/100$ of the dry weight of the solid in the slurry, and saccharification reaction was carried out at 50° C. for 24 hours. Thereafter, treatment with a filter press (manufactured by manufactured by Yabuta Industries Co., Ltd., MO-4) was carried out for separation/removal of undegraded cellulose and lignin, to obtain a sugar liquid derived from the cellulose-containing biomass. The sugar liquid was then subjected to filtration through a microfiltration membrane having a pore size of 0.22 μm, to remove micron-sized insoluble particles. The thus obtained sugar liquid derived from a cellulose-containing biomass was used in the Examples below.

Reference Example 3

Conditions for Analysis of Each Compound

1. Conditions for Analysis of Sugars

The glucose and xylose concentrations in the sugar liquid were quantified under the following conditions for high-performance liquid chromatography based on comparison with standard samples:

Apparatus: ACQUITY UPLC system (manufactured by Waters)

Column: ACQUITY UPLC BEH Amide 1.7 μm 2.1×100 mm Column (manufactured by Waters)

Mobile phase: Solution A, 80% acetonitrile+0.2% TEA; Solution B, 30% acetonitrile+0.2% TEA Flow rate: 0.3 mL/min.

Temperature: 55° C.

2. Conditions for Analysis of Acetic Acid

The concentration of acetic acid, which is a fermentation inhibitor in the sugar liquid, was quantified under the HPLC conditions described below, based on comparison with standard samples:

Apparatus: Hitachi high-performance liquid chromatograph Lachrom elite (manufactured by Hitachi, Ltd.)

Column: GL-C610H-S (manufactured by Hitachi, Ltd.)

Mobile phase: 3 mM perchloric acid

Reaction liquid: bromothymol blue solution

Detection method: UV-VIS detector

Flow rate: mobile phase, 0.5 mL/min.; reaction liquid, 0.6 mL/min.

Temperature: 60° C.

3. Conditions for Analysis of Aromatic Compounds

The concentrations of HMF and vanillin, which are fermentation inhibitors, in the sugar liquid were quantified under the following HPLC conditions based on comparison with standard samples:

Apparatus: Hitachi high-performance liquid chromatograph Lachrom elite (manufactured by Hitachi, Ltd.)

Column: Synergi 2.5 μm Hydro-RP 100A (manufactured by Phenomenex, Inc.)

Detection method: Diode Array detector

Flow rate: 0.6 mL/min.

Temperature: 40° C.

4. Conditions for Analysis of Ethanol

The concentration of ethanol in the sugar liquid was quantified under the GC conditions described below, based on comparison with standard samples:

Apparatus: Shimadzu GC-2010 (manufactured by Shimadzu Corporation)

Column: TC-1 (inner diameter, 0.53 mm; length, 15 m; film thickness, 1.50 μm; manufactured by GL Sciences Inc.)

Detection method: FID.

Reference Example 4

Nanofiltration Membrane Treatment of Model Sugar Liquid

As a model sugar liquid, an aqueous solution containing 20 g/L each of glucose and xylose, which are monosaccharides, and 0.5 g/L each of acetic acid, HMF and vanillin, which are fermentation inhibitors, was prepared. This model sugar liquid was subjected to filtration using a nanofiltration membrane (UTC-60, manufactured by Toray Industries, Inc.) by the cross-flow method. The conditions for cross-flow filtration were adjusted as required as follows: liquid temperature, 25° C., membrane surface linear velocity, 20 cm/second; and operating pressure, 0.5 m/day. As a membrane separation apparatus, a compact flat membrane unit ("SEPA CF-II," manufactured by GE Osmonics; effective membrane area, 140 cm$^2$) that can be used as a compact tester for filtration with a spiral module was used. Since stabilization of the concentration in the filtrate side takes time, the liquid of filtrate was returned to the raw liquid side for 20 minutes, and the stable filtrate obtained thereafter was sampled and subjected to determination of the permeation rate according to Reference Example 1. The obtained results are shown in Table 1.

Example 1

Nanofiltration Membrane Treatment of Sugar Liquid Containing Organic Liquid Compound Having Relative Dielectric Constant of not Less than 17

Filtration was carried out by the same method as in Reference Example 4 except that one of ethanol, methanol, 1-propanol, 2-propanol, 1,2-propanediol, 1,3-propanediol, glycerin, 1-butanol, 2-butanol, isobutanol, 1,2-butanediol, 1,3-butanediol, 1,4-butanediol, 2,3-butanediol, ethylene glycol, acetone, acetonitrile, acrylonitrile, dimethylsulfoxide and dimethylformamide, which are organic liquid compounds having relative dielectric constants of not less than 17 at 25° C., was contained at a concentration of 5 g/L in the model sugar liquid described in Reference Example 4. The results of determination of the permeation rates according to Reference Example 1 are shown in Table 1.

Comparative Example 1

Nanofiltration Membrane Treatment of Sugar Liquid Containing Organic Liquid Compound Having Relative Dielectric Constant of Less than 17

Filtration was carried out by the same method as in Reference Example 4 except that one of tetrahydrofuran (THF, 7.5), benzyl alcohol (11.9), 1-hexanol (12.7), 2-hexanol (11.1) and cyclohexanol (16.4), which are organic liquid compounds having relative dielectric constants of less than 17 at 25° C. (each value in the parentheses represents the relative dielectric constant at 25° C.), was contained at a concentration of 5 g/L in the model sugar liquid described in Reference Example 4. The results of determination of the permeation rates according to Reference Example 1 are shown in Table 1.

As is evident from Table 1, we found that, only when an organic liquid compound was contained and the relative dielectric constant of the organic liquid compound at 25° C. was not less than 17 (Example 1), the permeation rates of the monosaccharides glucose and xylose remarkably decreased as compared to when the model sugar liquid contained no organic liquid compound (Reference Example 4). We also found that the effect to decrease the permeation rates of monosaccharides increased as the relative dielectric constant of the organic liquid compound contained increased. On the other hand, we also found that, even when an organic liquid compound was contained, the decrease in the monosaccharide permeation rates could be hardly seen when the relative dielectric constant of the organic liquid compound at 25° C. was less than 17 (Comparative Example 1). The permeation rates of the fermentation inhibitors acetic acid, HMF and vanillin hardly changed in all cases.

TABLE 1

| | Additive | Relative dielectric constant | Permeation rate through nanofiltration membrane (%) | | | | |
|---|---|---|---|---|---|---|---|
| | | | Glucose | Xylose | Acetic acid | HMF | Vanillin |
| Reference Example 4 | None | — | 9.9 | 12.3 | 96 | 100 | 100 |
| Comparative Example 1 | THF | 7.5 | 9.8 | 12.4 | 96 | 100 | 100 |
| | 2-Hexanol | 11.1 | 9.7 | 12.3 | 97 | 100 | 100 |
| | Benzyl alcohol | 11.9 | 9.8 | 12.3 | 96 | 100 | 100 |
| | 1-Hexanol | 12.7 | 9.7 | 12.2 | 96 | 100 | 100 |
| | Cyclohexanol | 15.9 | 9.6 | 12.2 | 96 | 100 | 100 |
| Example 1 | 2-Butanol | 17.2 | 8.7 | 11.7 | 97 | 100 | 100 |
| | 1-Butanol | 17.4 | 8.2 | 11.8 | 96 | 100 | 100 |
| | Isobutanol | 17.5 | 8.1 | 11.2 | 96 | 100 | 100 |
| | 2-Propanol | 19.8 | 6.2 | 6.9 | 96 | 100 | 100 |
| | 1-Propanol | 20.3 | 5.8 | 6.1 | 95 | 100 | 100 |
| | Acetone | 20.6 | 5.5 | 5.9 | 95 | 100 | 100 |
| | Ethanol | 24.8 | 2.2 | 4.6 | 96 | 100 | 100 |
| | 2,3-Butanediol | 28.5 | 1.6 | 3.5 | 96 | 100 | 100 |
| | 1,2-Butanediol | 29.5 | 1.8 | 3.8 | 96 | 100 | 100 |
| | 1,3-Butanediol | 30.0 | 1.6 | 3.7 | 95 | 100 | 100 |
| | 1,4-Butanediol | 31.9 | 1.5 | 3.4 | 96 | 100 | 100 |
| | 1,2-Propanediol | 30.2 | 1.3 | 2.3 | 96 | 100 | 100 |
| | Methanol | 32.6 | 1.3 | 2.5 | 95 | 100 | 100 |
| | Acrylonitrile | 32.7 | 1.4 | 2.5 | 95 | 100 | 100 |
| | 1,3-Propanediol | 34.2 | 1.2 | 2.2 | 95 | 100 | 100 |
| | Acetonitrile | 35.6 | 1.2 | 2.4 | 94 | 100 | 100 |
| | Dimethylformamide | 36.9 | 1.0 | 2.4 | 95 | 100 | 100 |
| | Ethylene glycol | 40.1 | 0.9 | 2.2 | 95 | 100 | 100 |
| | Glycerin | 45.0 | 0.8 | 2.3 | 95 | 100 | 100 |
| | Dimethyl sulfoxide | 46.0 | 0.7 | 2.4 | 94 | 100 | 100 |

Example 2

Influence of Concentration of Organic Liquid Compound

Aqueous solutions each containing one of ethanol, methanol, 1-propanol, 2-propanol, 1,2-propanediol, 1,3-propanediol, glycerin, 1-butanol, 2-butanol, isobutanol, 1,2-butanediol, 1,3-butanediol, 1,4-butanediol, 2,3-butanediol, ethylene glycol, acetone, acetonitrile, acrylonitrile, dimethylsulfoxide and dimethylformamide, which are organic liquid compounds having relative dielectric constants of not less than 17, at a concentration of 50 ppm, 500 ppm, 5000 ppm or 10,000 ppm in the model sugar liquid described in Reference Example 4 were prepared, and each solution was filtered by the same method as in Reference Example 4. The results of determination of the permeation rates of glucose and xylose according to the method of Reference Example 1 are shown in Table 2. As is evident from the results of Reference Example 4 and Table 2, when the model sugar liquid contained an organic liquid compound having a relative dielectric constant of not less than 17, the effect to decrease the monosaccharide permeation rate was found at the concentration of 50 ppm. This effect increased as the concentration of the organic liquid compound increased, and we found that the effect almost reaches the upper limit at 5000 ppm.

TABLE 2

| | | Additive concentration (ppm) | | | | | | | |
|---|---|---|---|---|---|---|---|---|---|
| | | 50 | | 500 | | 5000 | | 10000 | |
| | | Permeation rate through nanofiltration membrane (%) | | Permeation rate through nanofiltration membrane (%) | | Permeation rate through nanofiltration membrane (%) | | Permeation rate through nanofiltration membrane (%) | |
| | Relative dielectric | | | | | | | | |
| Additive | constant | Glucose | Xylose | Glucose | Xylose | Glucose | Xylose | Glucose | Xylose |
| 2-Butanol | 17.2 | 9.4 | 12.1 | 8.9 | 11.9 | 8.7 | 11.7 | 8.6 | 11.7 |
| 1-Butanol | 17.4 | 9.3 | 12.0 | 8.7 | 11.9 | 8.2 | 11.8 | 8.3 | 11.7 |
| Isobutanol | 17.5 | 9.3 | 11.8 | 8.7 | 11.6 | 8.1 | 11.2 | 8.0 | 11.2 |
| 2-Propanol | 19.8 | 8.9 | 11.2 | 6.2 | 7.9 | 6.2 | 6.9 | 6.1 | 6.8 |
| 1-Propanol | 20.3 | 8.8 | 11.2 | 5.9 | 7.6 | 5.8 | 6.1 | 5.7 | 5.9 |
| Acetone | 20.6 | 8.4 | 10.9 | 5.4 | 7.1 | 5.5 | 5.9 | 5.3 | 5.9 |
| Ethanol | 24.8 | 7.5 | 10.0 | 4.2 | 5.8 | 2.2 | 4.6 | 2.1 | 4.5 |
| 2,3-Butanediol | 28.5 | 7.3 | 9.2 | 3.9 | 5.0 | 1.6 | 3.5 | 1.5 | 3.5 |
| 1,2-Butanediol | 29.5 | 7.2 | 9.1 | 3.8 | 4.9 | 1.8 | 3.8 | 1.8 | 3.7 |
| 1,3-Butanediol | 30.0 | 7.3 | 9.1 | 3.7 | 4.9 | 1.6 | 3.7 | 1.6 | 3.7 |
| 1,4-Butanediol | 31.9 | 7.2 | 9.0 | 3.7 | 4.9 | 1.5 | 3.4 | 1.5 | 3.2 |
| 1,2-Propanediol | 30.2 | 7.2 | 8.6 | 3.5 | 3.6 | 1.3 | 2.3 | 1.2 | 2.3 |
| Methanol | 32.6 | 7.0 | 8.8 | 3.7 | 4.1 | 1.3 | 2.5 | 1.3 | 2.5 |
| Acrylonitrile | 32.7 | 7.0 | 8.7 | 3.6 | 4.0 | 1.4 | 2.5 | 1.3 | 2.4 |
| 1,3-Propanediol | 34.2 | 7.1 | 8.5 | 3.4 | 3.3 | 1.2 | 2.2 | 1.2 | 2.2 |

TABLE 2-continued

| | | Additive concentration (ppm) | | | | | | | |
|---|---|---|---|---|---|---|---|---|---|
| | | 50 Permeation rate through nanofiltration membrane (%) | | 500 Permeation rate through nanofiltration membrane (%) | | 5000 Permeation rate through nanofiltration membrane (%) | | 10000 Permeation rate through nanofiltration membrane (%) | |
| Additive | Relative dielectric constant | Glucose | Xylose | Glucose | Xylose | Glucose | Xylose | Glucose | Xylose |
| Acetonitrile | 35.6 | 7.3 | 8.4 | 3.3 | 3.0 | 1.2 | 2.4 | 1.2 | 2.4 |
| Dimethylformamide | 36.9 | 7.1 | 8.4 | 3.2 | 2.9 | 1.0 | 2.4 | 1.0 | 2.3 |
| Ethylene glycol | 40.1 | 6.8 | 8.3 | 3.1 | 2.8 | 0.9 | 2.2 | 0.9 | 2.2 |
| Glycerin | 45.0 | 6.8 | 8.0 | 3.0 | 2.7 | 0.8 | 2.3 | 0.8 | 2.2 |
| Dimethyl sulfoxide | 46.0 | 6.7 | 8.0 | 2.9 | 2.8 | 0.7 | 2.4 | 0.8 | 2.3 |

Example 3

Nanofiltration Membrane Treatment of Distillation Residue Liquid after Ethanol Fermentation of Sugar Liquid Derived from Cellulose-Containing Biomass To recover the residual sugar after fermentation contained in the distillation residue liquid obtained by ethanol fermentation and distillation of a sugar liquid which is derived from a cellulose-containing biomass and obtained by the method of Reference Example 2, nanofiltration membrane treatment of the distillation residue liquid was studied. For preculture, 5 mL of the medium shown in Table 3 was subjected to filter sterilization ("Steriflip," manufactured by MILLIPORE, average pore size, 0.22 μm), and baker's yeast (*Saccharomyces cerevisiae*) was cultured overnight in a test tube at 30° C. with shaking From the preculture, baker's yeasts were collected by centrifugation, and the yeasts were washed well with 15 mL of sterile water. The washed baker's yeasts were inoculated to 100 mL of a sugar liquid that was derived from a cellulose-containing biomass and obtained by the method of Reference Example 2, and cultured in a 500-mL Sakaguchi flask for 24 hours with shaking (main culture). Solids were removed from the main culture by centrifugation, and the main culture was further subjected to filtration through a microfiltration membrane ("Stericup," manufactured by Millipore; average pore size, 0.22 μm) to obtain a clear cellulose sugar fermentation residue liquid. The cellulose sugar fermentation residue liquid was then subjected to distillation using a rotary evaporator, and the obtained cellulose sugarderived distillation residue liquid was filtered by the same method as in Reference Example 4. Table 4 shows the results of determination of the concentrations of sugars (glucose and xylose) and ethanol in the cellulose sugar distillation residue liquid, and the results of determination of the permeation rates of glucose, xylose, acetic acid, HMF and vanillin according to the method of Reference Example 1.

TABLE 3

| Composition | Composition concentration |
|---|---|
| Glucose | 50 g/L |
| Dropout MX | 3.8 g/L |
| Yeast NTbase | 1.7 g/L |
| Ammonium sulfate | 5 g/L |

Comparative Example 2

Nanofiltration Membrane Treatment of Model Distillation Residue Liquid

As a model distillation residue liquid, an aqueous solution containing the same concentrations of glucose, xylose, acetic acid, HMF and vanillin as in the cellulose sugar fermentation residue liquid described in Example 3 was prepared using reagents. The model distillation residue liquid was filtered by the same method as in Reference Example 4. The results of determination of the permeation rate of each compound according to the method of Reference Example 1 are shown in Table 4.

As is evident from Table 4, we found that the cellulose sugar fermentation residue liquid containing ethanol had lower permeation rates of monosaccharides through the nanofiltration membrane as compared to the model distillation residue liquid containing no ethanol at all. On the other hand, no difference was found for the permeation rates of the fermentation inhibitors acetic acid, HMF and vanillin through the nanofiltration membrane.

TABLE 4

| | | Concentration of each component in the liquid (g/L) | | | Permeation rate through nanofiltration membrane (%) | | | | |
|---|---|---|---|---|---|---|---|---|---|
| | | Glucose | Xylose | Ethanol | Glucose | Xylose | Acetic acid | HMF | Vanillin |
| Example 3 | Cellulose sugar derived distillation residue liquid | 3.2 | 120.5 | 5.3 | 1.2 | 6.0 | 96 | 100 | 100 |

TABLE 4-continued

| | | Concentration of each component in the liquid (g/L) | | | Permeation rate through nanofiltration membrane (%) | | | | |
|---|---|---|---|---|---|---|---|---|---|
| | | Glucose | Xylose | Ethanol | Glucose | Xylose | Acetic acid | HMF | Vanillin |
| Comparative Example 2 | Model distillation residue liquid | 3.2 | 120.5 | 0 | 9.2 | 14.3 | 96 | 100 | 100 |

Comparative Example 3

Nanofiltration Membrane Treatment of Model Sugar Liquid Containing Various Sugars Filtration was carried out by the same method as in Reference Example 4 except that an aqueous solution containing 10 g/L each of mannose, galactose, fructose, arabinose, xylitol and sorbitol, and 0.5 g/L each of fermentation inhibitors acetic acid, HMF and vanillin, was used as the model sugar liquid. The results of determination of the permeation rates according to Reference Example 1 are shown in Table 5.

Example 4

Nanofiltration Membrane Treatment of Model Sugar Liquid Containing Various Sugars in Presence of Ethanol or Ethylene Glycol Filtration was carried out by the same method as in Comparative Example 3 except that either one of ethanol and ethylene glycol, which are organic liquid compounds having relative dielectric constants of not less than 17 at 25° C., was contained at a concentration of 5 g/L in the model sugar liquid described in Comparative Example 3. The results of determination of the permeation rates according to Reference Example 1 are shown in Table 5.

As is evident from Table 5, we found that the model sugar liquids containing either one of ethanol and ethylene glycol show lower permeation rates of monosaccharides through the nanofiltration membrane as compared to the model sugar liquid containing neither ethanol nor ethylene glycol. On the other hand, no difference was found in the permeation rates of fermentation inhibitors acetic acid, HMF and vanillin through the nanofiltration membrane.

INDUSTRIAL APPLICABILITY

Our methods are useful as a method of increasing the yield of a sugar liquid in a method of producing a sugar liquid comprising the step of filtration through a nanofiltration membrane.

The invention claimed is:
1. A method of producing a sugar liquid comprising:
filtering a liquid containing sugar and at least one organic liquid compound selected from the group consisting of ethanol, methanol, 1-propanol, 2-propanol, 1,2-propanediol, 1-butanol, 2-butanol, isobutanol, 1,2-butanediol, 1,3-butanediol, 1,4-butanediol, 2,3-butanediol, ethylene glycol, acetone, acetonitrile, acrylonitrile, dimethylsulfoxide and dimethylformamide, and having a relative dielectric constant of not less than 17 at 25° C. through a nanofiltration membrane to purify and concentrate
a sugar liquid at a feed side of the nanofiltration membrane such that the organic liquid compound increases yield of the sugar liquid sugar compared to filtration of a sugar liquid without the organic liquid compound, and
filtering permeate containing the organic liquid compound from the nanofiltration membrane through a reverse osmosis membrane to collect the organic liquid compound.
2. The method according to claim 1, wherein total concentration of said organic liquid compound having a relative dielectric constant of not less than 17 at 25° C. in said sugar liquid to be subjected to nanofiltration membrane treatment is 50 ppm to 10,000 ppm.

TABLE 5

| | Additive | Relative dielectric constant | Permeation rate through nanofiltration membrane (%) | | | | | | | | |
|---|---|---|---|---|---|---|---|---|---|---|---|
| | | | Mannose | Galactose | Fructose | Arabinose | Xylitol | Sorbitol | Acetic acid | HMF | Vanillin |
| Comparative Example 3 | None | — | 9.7 | 8.6 | 9.1 | 13.5 | 10.7 | 6.5 | 96 | 100 | 100 |
| Example 4 | Ethanol | 24.8 | 2.0 | 1.6 | 2.6 | 5.7 | 3.5 | 3.3 | 97 | 100 | 100 |
| | Ethylene glycol | 40.1 | 0.8 | 0.5 | 1.2 | 3.6 | 1.4 | 0.5 | 96 | 100 | 100 |

3. The method according to claim 1, wherein said sugar liquid to be subjected to nanofiltration membrane treatment is derived from a cellulose-containing biomass.
4. A method of producing a sugar liquid comprising:
filtering a liquid containing sugar and at least one organic liquid compound selected from the group consisting of ethanol, methanol, 1-propanol, 2-propanol, 1,2-propanediol, 1-butanol, 2-butanol, isobutanol, 1,2-butanediol, 1,3-butanediol, 1,4-butanediol, 2,3-butanediol, ethylene glycol, acetone, acetonitrile, acrylonitrile, dimethylsulfoxide and dimethylformamide, and having a relative dielectric constant of not less than 17 at 25° C. through a nanofiltration membrane to purify and concentrate a sugar liquid at a feed side of the nanofiltration membrane such that the organic liquid compound increases yield of the sugar liquid sugar compared to filtration of a sugar liquid without the organic liquid compound.

\* \* \* \* \*